(12) United States Patent
Walters et al.

(10) Patent No.: US 6,590,361 B2
(45) Date of Patent: Jul. 8, 2003

(54) METHOD AND SYSTEM FOR CONTROLLING AN INDUCTION MACHINE

(75) Inventors: James E. Walters, Carmel, IN (US); Fani S. Gunawan, Westfield, IN (US); Gerald Thomas Fattic, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 59 days.

(21) Appl. No.: 09/909,356

(22) Filed: Jul. 19, 2001

(65) Prior Publication Data

US 2003/0015989 A1 Jan. 23, 2003

(51) Int. Cl.[7] .................................. H02P 1/42
(52) U.S. Cl. .................. 318/727; 318/804; 318/805; 318/806; 318/807; 318/808; 318/809; 318/810; 318/811
(58) Field of Search .................. 318/727, 804–811

(56) References Cited

U.S. PATENT DOCUMENTS

| 4,262,251 A | * | 4/1981 | Fujishiro et al. | ....... 324/207.25 |
|---|---|---|---|---|
| 5,041,979 A | * | 8/1991 | Hirka et al. | ................ 701/102 |
| 5,334,923 A | * | 8/1994 | Lorenz et al. | .............. 318/805 |
| 5,365,158 A | * | 11/1994 | Tanaka et al. | .............. 318/806 |
| 5,796,236 A | * | 8/1998 | Royak | ........................ 318/804 |
| 5,814,957 A | * | 9/1998 | Yoshida | ...................... 318/439 |

* cited by examiner

*Primary Examiner*—Rita Leykin
(74) *Attorney, Agent, or Firm*—Margaret A. Dobrowitsky

(57) ABSTRACT

Method and system for controlling an induction machine are provided. The method allows to sense rotor position of the induction machine using a relatively low-resolution rotor position sensor configured to supply a stream of pulses indicative of angular increments as the rotor position changes. A memory device is used for storing a synchronous angle boost function. The method further allows to retrieve from the memory device at least one function parameter for providing a synchronous angle boost during a start up mode of operation of the induction machine. Upon sensing a predetermined number of pulses from the rotor position sensor, the method allows to switch from the start up mode of operation to a normal mode of operation, wherein the boost provided to the synchronous angle is discontinued upon switching to the normal mode of operation.

20 Claims, 3 Drawing Sheets

METHOD AND SYSTEM FOR CONTROLLING AN INDUCTION MACHINE

BACKGROUND OF THE INVENTION

The present invention is generally related to system and method for controlling an electrical machine, and, more particularly, to system and method for controlling an induction machine using a slip boost technique during start up of the machine.

The advent of modern power electronics has in recent years dramatically changed machine and controller hardware used in traction control or electric vehicle applications. In the past, direct current (DC) machines have been very popular in such applications because of their generally linear torque response to armature current across a relatively wide range of speeds, and further because of the relative ease for respectively decoupling field and armature currents that enable independent control of either the field flux or the output torque to achieve a desired torque response. Unfortunately, DC machines generally suffer from lower machine efficiencies and the burdensome maintenance, speed limitations, and costs that accompany the use of conducting brushes and commutators. The disadvantages of DC machines have been reduced by the use of alternating current (AC) induction machines controlled by a suitable inverter, e.g., an insulated gate bipolar transistor (IGBT) or metal oxide semiconductor field effect transistor (MOSFET) inverter.

Propulsion drive systems for electric vehicles or hybrid electric vehicles need to have a relatively wide speed range, high torque per ampere, high efficiency, quick dynamic response, and operational robustness and reliability under tough environmental or operational conditions. As suggested above, induction machines have become widely used in such applications due to the advantages of their relatively low cost, reliability, and elimination of brushes and commutators. In particular, an induction machine is capable of four quadrant operation using a variable frequency and variable voltage drive control, such as a slip frequency control technique and a vector control technique. The use of vector control techniques in induction machines allows for decoupling the respective machine current components, such as a flux-producing component and a torque-producing component, to generate a machine response like that of a DC machine.

It is known that to reduce the cost of a propulsion system for applications such as Flywheel Alternator Starter (FAS) type hybrid vehicle, a relatively low resolution rotor position sensor or encoder would be more desirable than a high resolution rotor sensor due to the lower cost and higher reliability of the low resolution sensor. Since a high performance propulsion system generally requires a fine rotor position resolution, intelligent extrapolation techniques are being developed by the assignee of the present invention to increase the resolution available to a vector control module by extrapolating pulses in between any two successive coarse pulses of the low resolution encoder. This extrapolation technique has been found to work well across the required speed range, except during start up of the induction machine. In starting, the first several coarse pulses are generated under fast acceleration of the rotor, and this condition, somewhat prevents the extrapolation technique from producing sufficiently accurate rotor position information. The inability to produce accurate high resolution pulses during start up of the machine can result in unsuccessful cranking events if the electric machine cannot produce enough torque to overcome the compression and frictional forces of an internal combustion engine coupled thereto.

The synchronous angle boost technique of the present invention addresses the foregoing issues by providing estimated rotor position information during the first few coarse pulses. The inaccurate position information from the extrapolation technique is essentially discarded during start up and replaced by the estimated position information derived from the synchronous angle boost technique. After the extrapolation technique is able to produce accurate rotor position information, the synchronous angle boost technique is turned off.

BRIEF SUMMARY OF THE INVENTION

Generally, the present invention fulfills the foregoing needs by providing in one aspect thereof, a method for controlling an induction machine. The method allows to sense rotor position of the induction machine using a relatively low-resolution rotor position sensor configured to supply a stream of pulses indicative of angular increments as the rotor position changes. A memory device is used for storing a synchronous angle boost function. The method further allows to retrieve from the memory device at least one function parameter for providing a synchronous angle boost during a start up mode of operation of the induction machine. Upon sensing a predetermined number of pulses from the rotor position sensor, the method allows to switch from the start up mode of operation to a normal mode of operation, wherein the boost provided to the synchronous angle is discontinued upon switching to the normal mode of operation.

The present invention further fulfills the foregoing needs by providing in another aspect thereof, a system for controlling an induction machine. The system comprises a rotor position sensor for sensing rotor position of the induction machine. The sensor supplies a stream of pulses indicative of relatively coarse angular increments as the rotor position changes. A memory device is provided for storing a synchronous angle boost function. A boost module is coupled to retrieve from the memory device at least one function parameter for providing a synchronous angle boost during a start up mode of operation of the induction machine. A switching module is configured to switch from the start up mode of operation to a normal mode of operation upon sensing a predetermined number of pulses from the rotor position sensor, wherein the switching module passes the boosted synchronous angle from the boost module during the start up mode, and wherein the boost provided to the synchronous angle is discontinued upon switching to the normal mode of operation.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
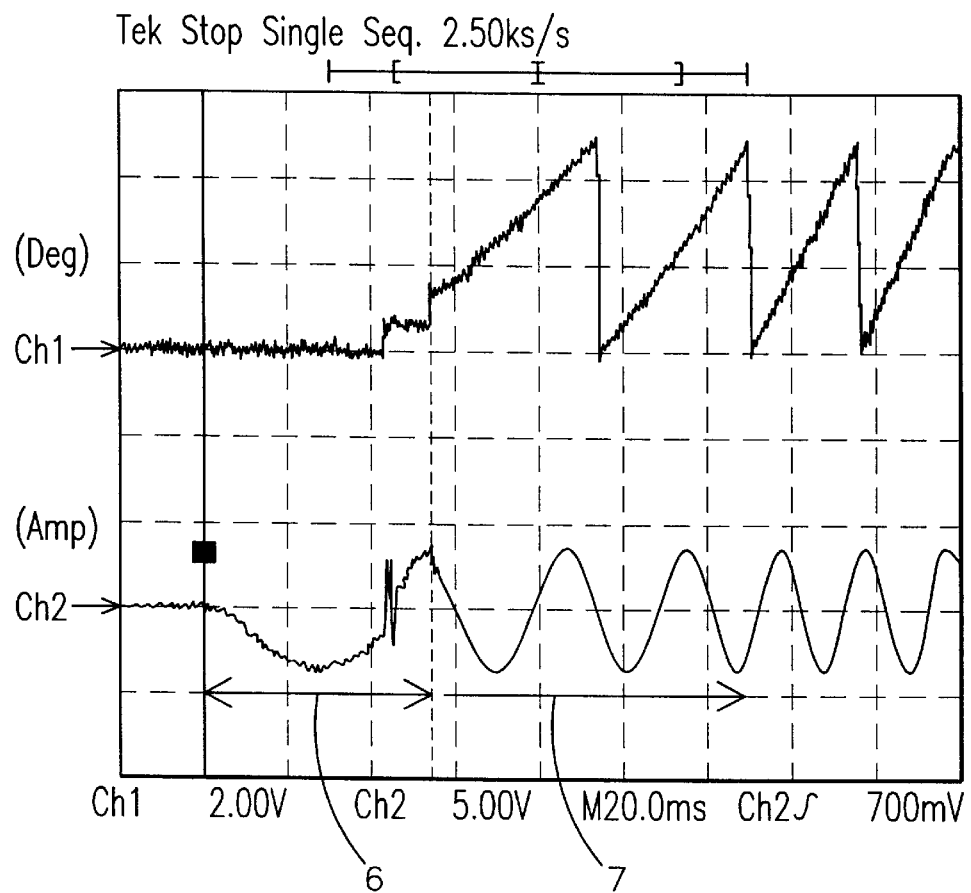
FIG. 1 shows exemplary plots of respective signals including discontinuities that may occur during a start up mode of operation of an induction machine and may result in undesirable torque reduction when using a standard low-resolution position sensor.
Figure 2:
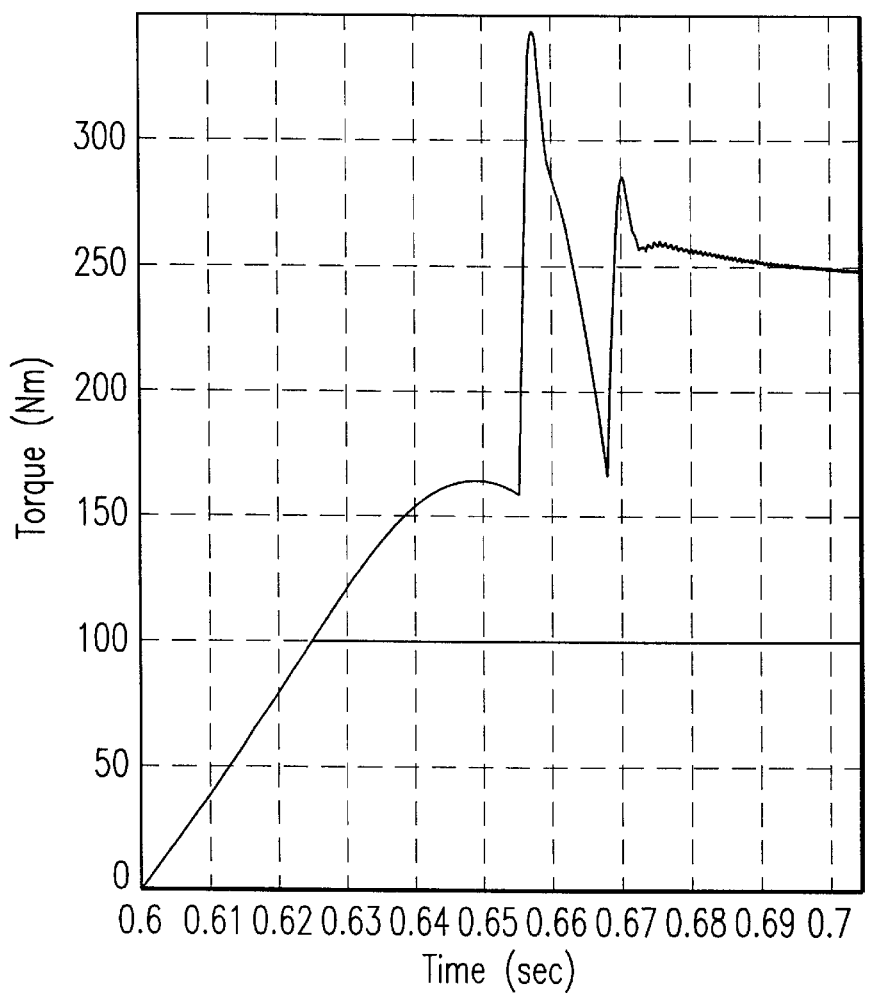
FIG. 2 shows a plot illustrating in detail an example of the undesirable torque reduction that may result from the signal discontinuities of FIG. 1.

FIG. 1 illustrates respective plots of a signal indicative of rotor position (Ch 1) and a signal indicative of phase current (Ch 2) of the machine during a simulated cranking condition using a relatively low resolution position sensor or position encoder (e.g., an encoder including a toothed wheel comprising about 64 teeth or less). The simulated condition depicted in FIG. 1 assumes a suitable processing technique for extrapolating rotor position between any two successive pulses of the stream of relatively coarse pulses provided by the rotor position sensor. The inventors of the present invention noted that the discontinuity observed during the first few pulse transition edges in the rotor position signal corresponds to the inability of the extrapolation technique to accurately extrapolate during a start-up mode of operation of the machine. Since the level of torque of the induction machine depends to a large degree on the level and phase of the energizing current, the discontinuities in the energizing current due to the inability of extrapolating accurately the first few pulses of the low-resolution encoder results, as shown in FIG. 2, in undesirable reduction in the level of torque produced by the machine.

As seen in FIG. 1, the extrapolation technique works well, as evidenced by the lack of discontinuity in the rotor position and energizing current signal, after occurrence of the first few pulse transition edges. For example, the time interval 6 in FIG. 1 may correspond to a start-up mode of operation of the machine, followed by a normal mode of operation of the machine (represented by arrow 7 in FIG. 1) subsequent to the start-up mode of operation.

Figure 3:
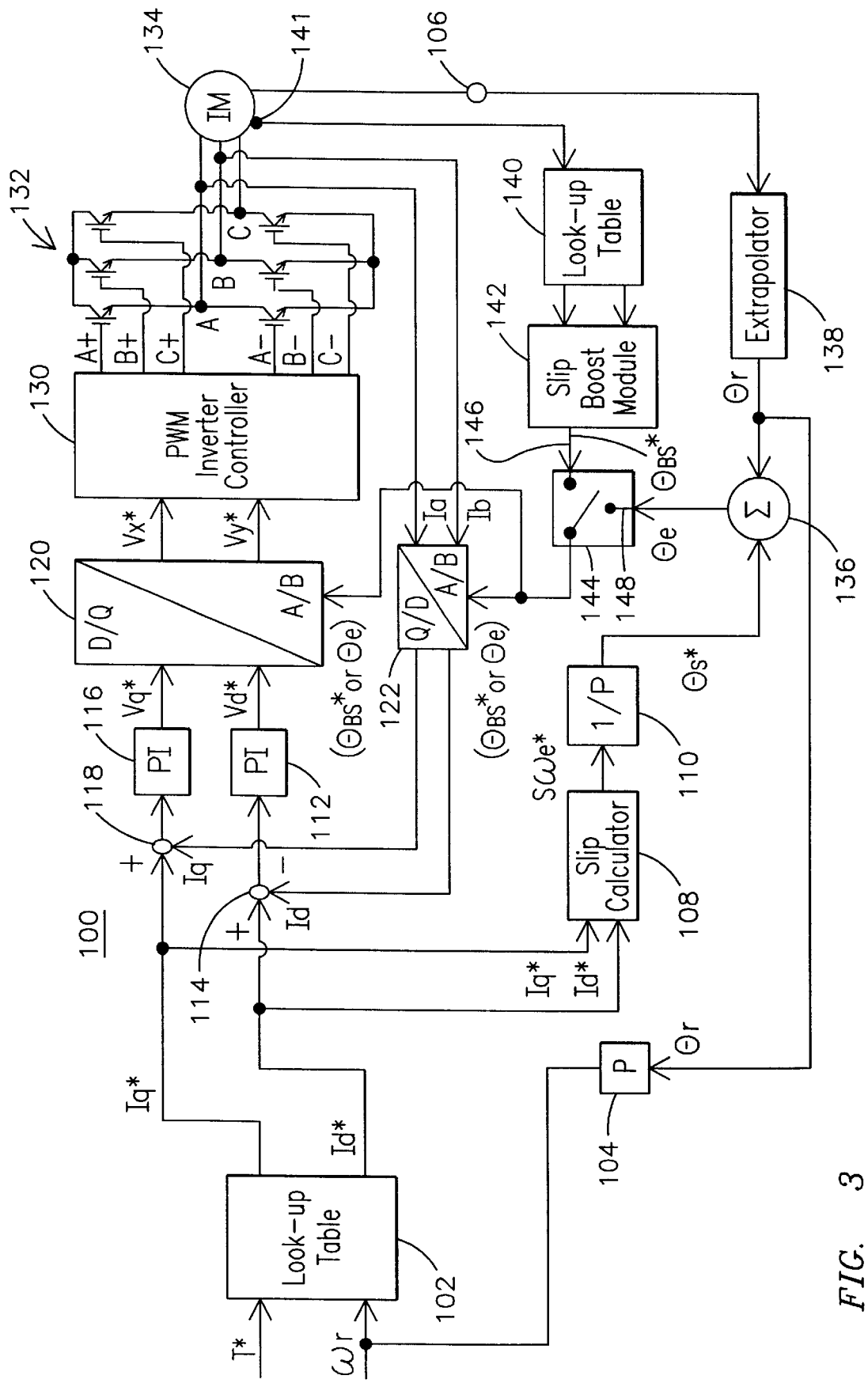
FIG. 3 shows a block diagram representation of an exemplary propulsion system configured to implement synchronous angle boost during start up of the machine in accordance with aspects of the present invention.

FIG. 3 shows one exemplary embodiment of a propulsion system 100 that may benefit from the slip boost technique of the present invention. As shown in FIG. 3, the d axis current reference (Id*) and the q axis current reference (Iq*) is each adjusted as a function of commanded torque T* and rotor speed $\omega_r$ using experimentally and/or analytically derived flux-adjusting coefficients stored in a two-dimensional flux look-up table 102.

The value of the torque reference signal T* may be externally-derived by a system master controller (not shown) or may correspond to the torque value commanded by an operator through a suitable machine propulsion throttle handle. The value of the rotor speed signal $\omega_r$ may be derived from a rotor angle value ($\theta r$), upon execution of a mathematical differentiation operation by a differentiator 104 which receives signal ($\theta r$), e.g., a stream of pulses indicative of angular increments of rotor shaft angle, such as may be generated by a rotor position sensor 106 having relatively low resolution. As will be appreciated by those of ordinary skill in the art, the sensor 106 may be selected from a variety of readily known and commercially available configurations. Examples of sensors that may be used for sensing rotor position may include Hall-effect sensors, magneto-resistive sensors, resolvers and optical sensors.

The d axis current reference (Id*), and the q axis current reference (Iq*) is each applied to a slip calculator unit 108 to calculate a slip frequency signal ($s\omega_e$*). An integrator 110 receives the slip frequency signal to generate a slip signal ($\theta s$*). The d axis current reference (Id*) is further applied to a proportional plus integral (PI) current regulator 112 after processing by a subtractor 114 of the d axis current reference signal (Id*) against a feedback current signal Id. It will be appreciated that the difference output signal from subtractor 114 represents an error signal between the d axis current reference signal (Id*) and the feedback current signal Id. Similarly, the torque current component reference (Iq*), is applied to a proportional plus integral (PI) current regulator 116 after processing by a subtractor 118 of the torque current component reference (Iq*) against a feedback current Iq. In this case, the difference output signal from subtractor 118 represents an error signal between the torque current component signal (Iq*) and the feedback current signal Iq.

As will be readily understood by those skilled in the art, the vector control module includes voltage and current transformation units 120 and 122, each using techniques well-understood by those skilled in the art. The respective outputs of PI regulators 112 and 116 are provided to voltage transformation unit 120 and are converted into equivalent two-phase voltage references in the stationary frame. Current transformation unit 122 converts the three-phase currents in the stationary frame into equivalent two-phase orthogonal currents in the synchronous frame. After the transformation is executed, the two orthogonal current signals Iq and Id in the synchronous frame are respectively applied to the two PI current regulators 112 and 116 as current feedback signals through subtractors 114 and 118. For readers who desire further background regarding vector control techniques, reference is made to Chapters 5 and 6 of textbook by D. W. Novotny and T. A. Lipo, titled "Vector Control and Dynamics of AC Drives", published by Oxford University Press, 1996, which textbook is herein incorporated by reference.

As shown in FIG. 3, each respective output signal of voltage transformation unit 120 is applied to an inverter controller 130, such as a controller using pulse width modulation (PWM) or other suitable modulation technique. The controller in one exemplary embodiment may comprise an over-modulation space vector PWM unit to generate three respective duty cycle values to a suitable processor, such as an ADMC201 co-processor. It will be appreciated that the processor functionality is analogous to having six synchronous timers for respectively generating six-gate pulse signals to the respective gate drive circuits of the inverter 132 that energizes the AC induction machine 134. It will be further appreciated that the inverter will appropriately switch on and off according to the voltage levels of the gate signals from the processor in order to control operation of the induction machine. As suggested above, the slip calculator 108 generates a slip frequency signal, $s\omega_e$*, which is then integrated by integrator 110 to generate the slip signal ($\theta s$*) which is then combined in a summer 136 with the output from an extrapolator 138 that processes the relatively coarse angular pulses from the relatively low resolution position encoder 106 to generate a synchronous angle signal ($\theta e$) respectively used by transformation units 120 and 122.

As suggested above, the use of a relatively low resolution rotor position sensor in combination with a suitable extrapolation technique has been demonstrated to provide satisfactory control of the induction machine except during the start up mode of the machine. FIG. 3 illustrates an exemplary embodiment that boosts the synchronous angle $\theta e$ by way of a slip boost module 142. It will be appreciated, however, that the synchronous angle $\theta e$ boosting effect may be achieved through other schemes. For example, those skilled in the art will appreciate that the boosting effect to the synchronous angle could be provided by way of a boosting module connected to boost the rotor angle θr or connected to boost the slip frequency sω$_e$*. Further, the boosting of the synchronous angle could be achieved by appropriate adjustments made to the values of the orthogonal currents commands, Iq* and Id* and hence to the slip frequency sω$_e$*. Thus, the description below, made in terms of a slip signal boost, is only one illustration of one exemplary scheme for boosting the value of the synchronous angle θe received by transformation units 120 and 122. As suggested above, the boosting of the synchronous angle provides estimated rotor position more appropriate to the high level of acceleration experienced by the rotor during start up of the machine. The synchronous angle boost function, regardless of whether performed through adjustments made to the slip signal, the frequency slip signal, the rotor angle signal, or the current command signals, essentially removes the substantial lag that would otherwise develop between the actual rotor position and the estimated rotor position during periods of high acceleration in the absence of a high resolution rotor position sensor.

As shown in FIG. 3, a memory device, such as look-up table 140, is used for storing a slip boost function that may be used during the start up mode of the machine to overcome the deficiencies of the extrapolation technique during periods of high angular acceleration of the rotor. During the start up mode of the machine, a slip boost module 142 is coupled to retrieve at least one function parameter for providing a slip boost during the start up mode of operation of the induction machine. A switch 144 is configured to pass the boosted slip signal (θbs*) from module 142 during the start up mode of operation of the machine. Upon sensing a predetermined number of pulses from the rotor position sensor, the switch 144 switches to a normal mode of operation so that the boost provided to the slip angle is discontinued. That is, during the start up mode of operation, switch 144 would establish a connection to terminal 146 to pass the boosted slip signal from the slip boost module 142, and during the normal mode of operation, switch 144 would remove the connection from terminal 146 and establish a connection to terminal 148 to pass the synchronous angle signal from summer 136.

Figure 4:
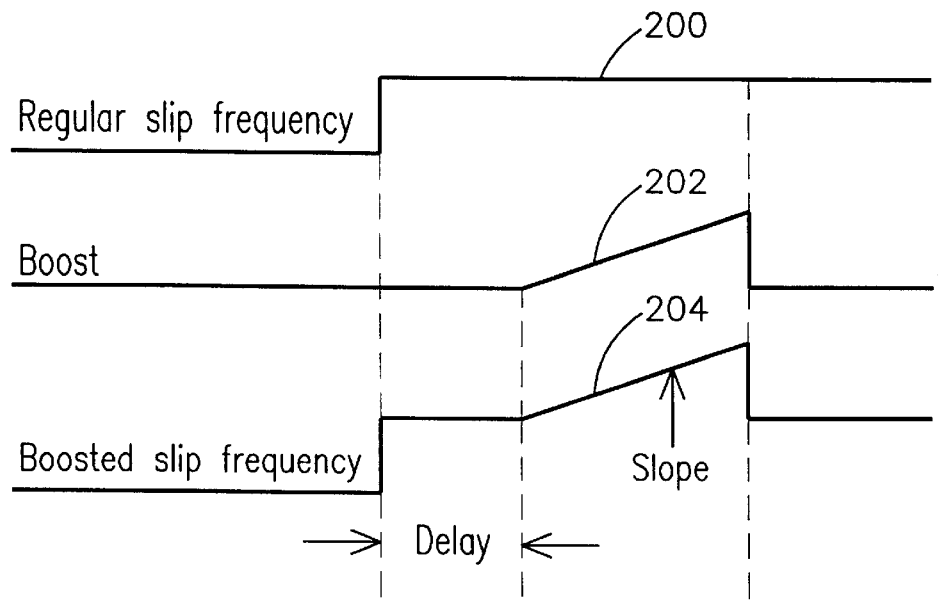
FIG. 4 shows respective signal plots for constructing an exemplary synchronous angle boost function.

FIG. 4 shows respective plots that may allow to conceptualize an exemplary composition of a boosted slip signal. As shown in FIG. 4, signal plot 200 corresponds to a regular slip signal without boost, such as may be provided from slip calculator 208 (FIG. 3). Signal plot 202 represents an exemplary slip boost function, such as may be stored in look-up table 140 (FIG. 3). Signal plot 204 represents the superposition of signal plots 200 and 202 to generate a boosted slip signal. As suggested above, function parameters that may be retrieved from look-up table 140 (FIG. 3) may include a parameter indicative of the magnitude of the boost to be applied to the slip signal during the start-up mode of operation of the machine. Another function parameter used for applying the slip boost may comprise a parameter indicative of a delay value for applying the slip boost. As shown in FIG. 3, a sensor 141 may be used for sensing at least one operational parameter of the induction machine, e.g., temperature, for adjusting the values of at least one function parameter stored in the look-up table, e.g., the delay value, based on the magnitude of the sensed operational parameter of the machine. That is, the synchronous angle boost function may be compensated to account for variations in machine and/or load characteristics due to environmental and/or operational conditions to which the machine is exposed.

In one exemplary embodiment, to determine the profile of the synchronous angle boost needed for a given class of induction machines, one may record for one or more typical cranking events, the synchronous angle signal from a high resolution encoder, e.g., a toothed encoder with about 1024 teeth. The recorded angles are then processed to determine the optimal boost function using a suitable mathematical tool application such as the Matlab tool application. As shown in signal plot 202, in one exemplary implementation, the magnitude of the boost varies (e.g., linearly) depending on the load as a function of time during the start up mode of operation of the induction machine. Thus, in this embodiment, the functional parameters for applying the boost function may correspond to the slope of the boost function and the delay value. It will be understood that, in general, the variation of the magnitude of the boost as a function of time need not be a linear variation since in any given application such a variation may assume a non-linear variation, e.g., quadratic, piece-wise linear approximation or any other functional approximation that best fits the load demands of the given application.

Figure 5:
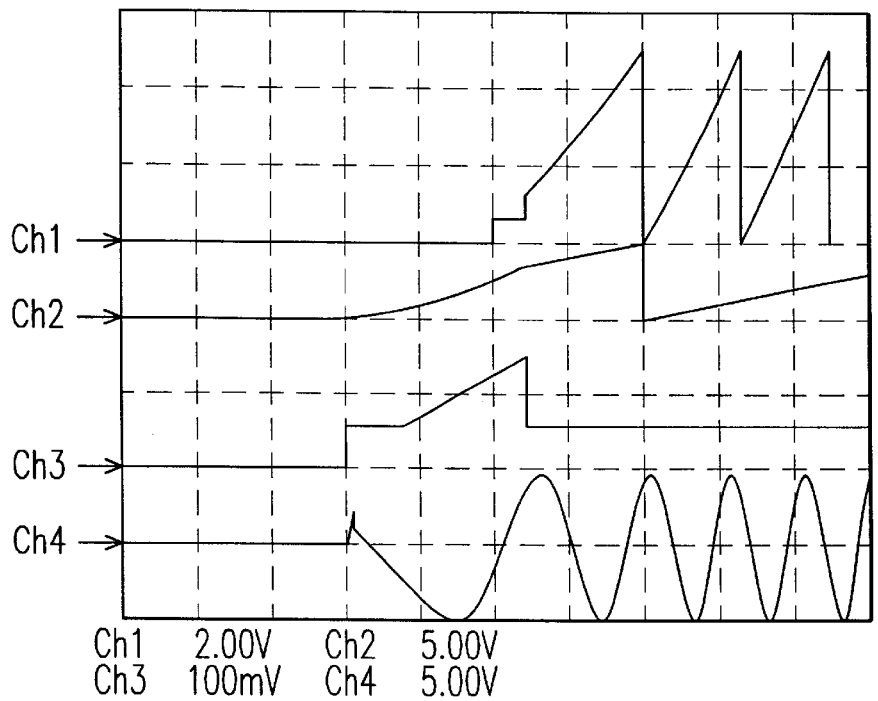
FIG. 5 shows respective signal plots corresponding to a simulated start of the machine using slip boost during start up of the machine.

FIG. 5 shows exemplary signal plots as a function of time in a simulated cranking event. This simulation assumes that synchronous angle boost is used only in the first few pulse transition edges from the low resolution rotor position sensor. Ch 1 shows a plot of rotor position as a function of time. Ch 2 shows a plot of synchronous angle as a function of time. Ch 3 represents a boosted slip signal, essentially the same as the slip boost function illustrated in FIG. 4. Ch 4 represents machine phase current. It will be appreciated than the phase or energizing current obtained using the synchronous angle boost technique of the present invention as shown in FIG. 5 does not have the undesirable discontinuities shown in FIG. 1. Thus, the torque produced during start up of the AC induction machine will have a torque value with a higher mean value than would be the case in the absence of synchronous angle boost. It is believed that the synchronous angle boost technique of the present invention substantially reduces the probability of a stall event during start up of the induction machine.

The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling an induction machine, the method comprising:

sensing rotor position of the induction machine using a relatively low-resolution rotor position sensor configured to supply a stream of pulses indicative of angular increments as the rotor position changes;

providing a memory device for storing a synchronous angle boost function;

retrieving from the memory device at least one function parameter for providing a synchronous angle boost during a start up mode of operation of the induction machine; and upon sensing a predetermined number of pulses from the rotor position sensor, switching from the start up mode of operation to a normal mode of operation, wherein the boost provided to the synchronous angle is discontinued upon switching to the normal mode of operation.

2. The method of claim 1 wherein said at least one function parameter comprises a parameter indicative of the magnitude of the boost to be applied to the synchronous angle during the start up mode of operation.

3. The method of claim 2 wherein the magnitude of the boost to be applied varies as a function of time during the start up mode of operation of the induction machine.

4. The method of claim 3 wherein said at least one function parameter further comprises a parameter indicative of a delay for applying the synchronous angle boost.

5. The method of claim 1 further comprising sensing at least one operational parameter of the induction machine.

6. The method of claim 5 further comprising adjusting the values of said at least one function parameter based on the magnitude of the sensed operational parameter of the machine.

7. The method of claim 5 wherein the sensed operational parameter of the induction machine comprises temperature of the induction machine.

8. A system for controlling an induction machine, the system comprising:

a rotor position sensor for sensing rotor position of the induction machine, said sensor configured to supply a stream of pulses indicative of relatively coarse angular increments as the rotor position changes;

a memory device for storing a synchronous angle boost function;

a boost module coupled to retrieve from the memory device at least one function parameter for providing a synchronous angle boost during a start up mode of operation of the induction machine; and a switching module configured to switch from the start up mode of operation to a normal mode of operation upon sensing a predetermined number of pulses from the rotor position sensor, wherein the switching module passes the boosted synchronous angle from the boost module during the start up mode, and wherein the boost provided to the synchronous angle is discontinued upon switching to the normal mode of operation.

9. The system of claim 8 wherein said at least one function parameter comprises a parameter indicative of the magnitude of the boost to be applied to the synchronous angle during the start up mode of operation.

10. The system of claim 9 wherein the magnitude of the boost to be applied varies as a function of time during the start up mode of operation of the induction machine.

11. The system of claim 10 wherein said at least one function parameter further comprises a parameter indicative of a delay for applying the synchronous angle boost.

12. The system of claim 8 further comprising at least one sensor for sensing at least one operational parameter of the induction machine.

13. The system of claim 12 further comprising an adjuster module for adjusting the values of the at least one function parameter based on the magnitude of the sensed operational parameter of the machine.

14. The system of claim 12 wherein the sensed operational parameter of the induction machine comprises temperature of the induction machine.

15. The method of claim 1 wherein the synchronous angle boost is performed by processing a signal selected from the group comprising slip, rotor angle, slip frequency, and respective current commands.

16. The method of claim 1 wherein, in the normal mode of operation, angular increments indicative of rotor position changes are based on extrapolating rotor position between successive ones of the stream of pulses from the low-resolution rotor position sensor.

17. A method for controlling an induction machine, the method comprising:

sensing rotor position of the induction machine using a relatively low-resolution rotor position sensor configured to supply a stream of pulses indicative of angular increments as the rotor position changes;

providing a memory device for storing a synchronous angle boost function;

retrieving from the memory device at least one function parameter for providing a synchronous angle boost during a start up mode of operation of the induction machine, wherein said at least one function parameter comprises a parameter indicative of the magnitude of the boost to be applied to the synchronous angle during the start up mode of operation, wherein the magnitude of the boost to be applied varies as a function of time during the start up mode of operation of the induction machine, wherein said at least one function parameter further comprises a parameter indicative of a delay for applying the synchronous angle boost; and upon sensing a predetermined number of pulses from the rotor position sensor, switching from the start up mode of operation to a normal mode of operation, wherein the boost provided to the synchronous angle is discontinued upon switching to the normal mode of operation.

18. A method for controlling an induction machine, the method comprising:

sensing rotor position of the induction machine using a relatively low-resolution rotor position sensor configured to supply a stream of pulses indicative of angular increments as the rotor position changes;

providing a memory device for storing a synchronous angle boost function;

retrieving from the memory device at least one function parameter for providing a synchronous angle boost during a start up mode of operation of the induction machine;

sensing at least one operational parameter of the induction machine, wherein the sensed operational parameter of the induction machine comprises temperature of the induction machine;

adjusting the values of said at least one function parameter based on the magnitude of the sensed operational parameter of the machine; and upon sensing a predetermined number of pulses from the rotor position sensor, switching from the start up mode of operation to a normal mode of operation, wherein the boost provided to the synchronous angle is discontinued upon switching to the normal mode of operation.

19. A system for controlling an induction machine, the system comprising:

a rotor position sensor for sensing rotor position of the induction machine, said sensor configured to supply a stream of pulses indicative of relatively coarse angular increments as the rotor position changes;

a memory device for storing a synchronous angle boost function;

a boost module coupled to retrieve from the memory device at least one function parameter for providing a synchronous angle boost during a start up mode of operation of the induction machine, wherein said at least one function parameter comprises a parameter indicative of the magnitude of the boost to be applied to the synchronous angle during the start up mode of operation, wherein the magnitude of the boost to be applied varies as a function of time during the start up mode of operation of the induction machine, wherein said at least one function parameter further comprises a parameter indicative of a delay for applying the synchronous angle boost; and a switching module configured to switch from the start up mode of operation to a normal mode of operation upon sensing a predetermined number of pulses from the rotor position sensor, wherein the switching module passes the boosted synchronous angle from the boost module during the start up mode, and wherein the boost provided to the synchronous angle is discontinued upon switching to the normal mode of operation.

20. A system for controlling an induction machine, the system comprising:

a rotor position sensor for sensing rotor position of the induction machine, said sensor configured to supply a stream of pulses indicative of relatively coarse angular increments as the rotor position changes;

a memory device for storing a synchronous angle boost function;

a boost module coupled to retrieve from the memory device at least one function parameter for providing a synchronous angle boost during a start up mode of operation of the induction machine;

at least one sensor for sensing at least one operational parameter of the induction machine, wherein the sensed operational parameter of the induction machine comprises temperature of the induction machine;

an adjuster module for adjusting the values of the at least one function parameter based on the magnitude of the sensed operational parameter of the machine; and a switching module configured to switch from the start up mode of operation to a normal mode of operation upon sensing a predetermined number of pulses from the rotor position sensor, wherein the switching module passes the boosted synchronous angle from the boost module during the start up mode, and wherein the boost provided to the synchronous angle is discontinued upon switching to the normal mode of operation.

* * * * *